(12) United States Patent
Yamada et al.

(10) Patent No.: US 10,408,987 B2
(45) Date of Patent: Sep. 10, 2019

(54) WAVELENGTH CONVERSION MEMBER AND BACKLIGHT UNIT INCLUDING SAME, AND LIQUID CRYSTAL DISPLAY DEVICE

(71) Applicant: FUJIFILM Corporation, Tokyo (JP)

(72) Inventors: Naoyoshi Yamada, Kanagawa (JP); Koichi Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 15/465,894

(22) Filed: Mar. 22, 2017

(65) Prior Publication Data

US 2017/0192146 A1    Jul. 6, 2017

Related U.S. Application Data

(63) Continuation of application No. PCT/JP2015/004914, filed on Sep. 29, 2015.

(30) Foreign Application Priority Data

Sep. 30, 2014  (JP) ................. 2014-200585
Aug. 24, 2015  (JP) ................. 2015-164880

(51) Int. Cl.
*G02F 1/1335*    (2006.01)
*F21V 8/00*    (2006.01)

(52) U.S. Cl.
CPC .......... *G02B 6/005* (2013.01); *G02B 6/0055* (2013.01); *G02F 1/133602* (2013.01);
(Continued)

(58) Field of Classification Search
CPC .......... H01L 51/502; H01L 31/035218; G02F 2001/01791
See application file for complete search history.

(56) References Cited

U.S. PATENT DOCUMENTS 5,721,603 A    2/1998  De Vaan et al.
9,470,399 B1 *  10/2016  Skipor ............. G02F 1/1336
(Continued)

FOREIGN PATENT DOCUMENTS

CN    102690658 A    9/2012
CN    103228983 A    7/2013
(Continued)

OTHER PUBLICATIONS

Notification of Reasons for Refusal issued by the Japanese Patent Office dated Aug. 1, 2017, in connection with Japanese Patent Application No. 2015-164880.
(Continued)

*Primary Examiner* — Paisley L Arendt
*Assistant Examiner* — Mariam Qureshi
(74) *Attorney, Agent, or Firm* — Edwards Neils LLC; Jean C. Edwards, Esq.

(57) ABSTRACT

A wavelength conversion member including a wavelength conversion layer containing quantum dots which are excited by exciting light and emit fluorescent light rays, in which the wavelength conversion layer includes base material films on at least one surface, and in the base material films, an absorbance of light at a wavelength of 450 nm measured by using an integrating sphere is less than 0.9%, and a total light ray transmittance is less than 92%.

9 Claims, 4 Drawing Sheets

(52) U.S. Cl.
CPC .. *G02F 1/133617* (2013.01); *G02F 1/133621* (2013.01); *G02F 2001/133614* (2013.01); *G02F 2202/36* (2013.01)

(56) References Cited

U.S. PATENT DOCUMENTS

| | | | |
|---|---|---|---|
| 2007/0231592 | A1 | 10/2007 | Agata |
| 2008/0049317 | A1 | 2/2008 | Hara |
| 2008/0213511 | A1 | 9/2008 | Ikeda et al. |
| 2012/0113672 | A1 | 5/2012 | Dubrow et al. |
| 2012/0206935 | A1 | 8/2012 | Seo et al. |
| 2014/0285998 | A1* | 9/2014 | Yoon ............... C07F 9/12 362/84 |
| 2014/0367633 | A1* | 12/2014 | Bibl ............ G02F 1/133603 257/13 |
| 2015/0204515 | A1* | 7/2015 | Xu .................. B82Y 20/00 362/84 |
| 2015/0300600 | A1 | 10/2015 | Dubrow et al. |
| 2016/0195229 | A1* | 7/2016 | Tokinoya ........... B32B 27/36 362/612 |
| 2017/0279247 | A1* | 9/2017 | Logunov ....... G02F 1/133603 |
| 2018/0198039 | A1* | 7/2018 | Lee ................. H01L 33/505 |

FOREIGN PATENT DOCUMENTS

| | | |
|---|---|---|
| JP | 3363565 B2 | 1/2003 |
| JP | 2003-177209 A | 6/2003 |
| JP | 3416302 B2 | 6/2003 |
| JP | 348626 B2 | 9/2003 |
| JP | 2005-096108 A | 4/2005 |
| JP | 2006-126774 A | 5/2006 |
| JP | 2007-290369 A | 11/2007 |
| JP | 4091978 B2 | 5/2008 |
| JP | 2008-262161 A | 10/2008 |
| JP | 2012-169271 A | 9/2012 |
| JP | 2013-544018 A | 12/2013 |
| WO | 2014/024068 A2 | 2/2014 |

OTHER PUBLICATIONS

International Search Report issued in connection with International Patent Application No. PCT/JP2015/004914 dated Jan. 19, 2016.
Written Opinion issued in connection with International Patent Application No. PCT/JP2015/004914 dated Jan. 19, 2016.
C.B. Murray et al.; "Synthesis and Characterization of Nearly Monodisperse CdE (E = S, Se, Te) Semiconductor Nanocrystallites"; Journal of American Chemical Society, 1993; pp. 8706-8715; vol. 115, No. 19.
B.O. Dabbousi et al.; "(CdSe)ZnS Core-Shell Quantum Dots: Synthesis and Characterization of a Size Series of Highly Luminescent Nanocrystallites"; The Journal Physical Chemistry B; 1997; pp. 9463-9475; vol. 101.
First Office Action issued by the State Intellectual Property Office of China dated Jul. 17, 2018, in connection with Chinese Patent Application No. 201580052329.5.
Office Action issued by the State Intellectual Property Office of China dated Apr. 10, 2019, in connection with Chinese Patent Application No. 201580052329.5.

* cited by examiner

WAVELENGTH CONVERSION MEMBER AND BACKLIGHT UNIT INCLUDING SAME, AND LIQUID CRYSTAL DISPLAY DEVICE

CROSS-REFERENCE TO RELATED APPLICATIONS

This application is a Continuation of PCT International Application No. PCT/JP2015/004914 filed on Sep. 29, 2015, which was published under PCT Article 21(2) in Japanese, and which claims priority under 35 U.S.C. § 119(a) to Japanese Patent Application No. 2014-200585 filed on Sep. 30, 2014 and Japanese Patent Application No. 2015-164880 filed on Aug. 24, 2015. The above applications are hereby expressly incorporated by reference, in their entirety, into the present application.

BACKGROUND OF THE INVENTION

1. Field of the Invention

The present invention relates to a wavelength conversion member including a wavelength conversion layer containing a quantum dot which emits fluorescent light by exciting light irradiation and a backlight unit including the wavelength conversion member, and a liquid crystal display device.

2. Description of the Related Art

A flat panel display such as a liquid crystal display device (hereinafter, also referred to as an LCD) has been widely used year by year as a space saving image display device having low power consumption. The liquid crystal display device is configured of at least a backlight unit and a liquid crystal cell, and in general, further includes a member such as a backlight side polarizing plate and a visible side polarizing plate.

Recently, in order to improve color reproducibility of an LCD, a configuration has received attention in which a wavelength conversion member of a backlight unit includes a wavelength conversion layer containing a quantum dot (QD, also referred to as a quantum point) as a light emitting material (refer to US2012/0113672A). The wavelength conversion member is a member which converts a wavelength of light incident from a planar light source and allows the light to exit as white light, and in the wavelength conversion layer containing the quantum dot as a light emitting material, it is possible to realize white light by using fluorescent light which is emitted from two types or three types quantum dots having different light emission properties by exciting the two types or three types quantum dots with the light incident from the planar light source.

The fluorescent light emitted from the quantum dot has a high brightness and a small half-width, and thus, an LCD using the quantum dot has excellent color reproducibility. A color reproduction range increases from 72% to 100% of the current TV standard (FHD, national television system committee (NTSC)) ratio according to progress in a three-wavelength light source technology using such a quantum dot.

In the quantum dot, there is a problem that light emission intensity decreases due to a photooxidation reaction in a case of being in contact with oxygen. Regarding this point, in US2012/0113672A, it is proposed that an oxygen barrier film is laminated on a layer containing a quantum dot in order to protect the quantum dot from oxygen or the like.

In general, in the oxygen barrier film, an aspect in which a base material having oxygen barrier properties is used, and thus, the base material itself is used as the oxygen barrier film, an aspect in which an inorganic layer or an organic layer having oxygen barrier properties is laminated on a surface of a base material film, and thus, the oxygen barrier properties are imparted, or the like is known as a base material film sandwiching the layer containing the quantum dot. An inorganic layer of an inorganic oxide, an inorganic nitride, an inorganic oxynitride, a metal, or the like is preferably used as the inorganic layer having oxygen barrier properties.

Here, in the base material film, an optical film having transparency as high as possible is required in order to minimize an optical loss due to the base material film. The transparency of the base material film, in general, is evaluated by the total light ray transmittance of the film. The total light ray transmittance, for example, is a value measured by using a hazemeter NDH4000 manufactured by Denshoku Industries Co., Ltd. Accordingly, an optical film of which surface reflectivity with respect to the base material film having a high total light ray transmittance is reduced, as described in JP2003-177209A, is preferably used as the base material film. In order to reduce the surface reflectivity, a method of disposing an antireflection layer on the surface, a method of suitably adjusting a refractive index or a film thickness of a functional layer such as an easily adhesive layer, which is disposed on the surface, and the like is adopted in the optical film.

SUMMARY OF THE INVENTION

However, according to studies of the present inventors, it has been found that even in a case of using a film having a high total light ray transmittance as the base material film, there is not only a case where a brightness of a backlight unit is not improved, but there is also a case where the brightness further decreases, in a wavelength conversion member containing a quantum dot.

The present invention has been made in consideration of the circumstances described above, and an object of the present invention is to provide a wavelength conversion member including a wavelength conversion layer containing a quantum dot which emits fluorescent light by exciting light irradiation, in which an optical loss is small.

In addition, another object of the present invention is to provide a high-brightness backlight unit including the wavelength conversion member having a small optical loss, and a liquid crystal display device.

In order to attain the objects described above, the present inventors have repeated intensive studies with respect to a base material film for preparing a wavelength conversion layer, and thus, have completed the present invention.

A wavelength conversion member of the present invention, is a wavelength conversion member, comprising: a wavelength conversion layer containing at least one type of quantum dot which is excited by exciting light and emits fluorescent light, in which the wavelength conversion layer includes a base material film on at least one surface, and in the base material film, an absorbance of light at a wavelength of 450 nm measured by using an integrating sphere is less than 0.9%, and a total light ray transmittance is less than 92%.

In this specification, the absorbance of the light using the integrating sphere indicates a value measured as described below. The base material film is cut into a size of 2 cm square, and then, is disposed in an integrating sphere of an absolute PL quantum yield measurement device (C9920-02) manufactured by Hamamatsu Photonics K.K., and detection light intensity I at 450 nm at the time that exciting light at 450 nm is incident is measured. Similarly, in a blank in which the film is not disposed in the integrating sphere, detection light intensity $I_0$ at 450 nm at the time that the exciting light at 450 nm is incident is measured, and thus, an absorbance A1 of light at a wavelength of 450 nm of the base material film is calculated on the basis of the following expression.

$$A1(I_0-I)/I_0 \quad \text{(Expression)}$$

In addition, the total light ray transmittance is a value measured according to JIS K7136 by using a hazemeter NDH2000 manufactured by Denshoku Industries Co., Ltd.

The base material film may include a surface modified layer such as an easily adhesive layer on the surface.

In addition, the base material film may further include a functional layer such as an oxygen barrier layer or an optical diffusion layer. In this case, the base material film can be a base material of the oxygen barrier layer or the optical diffusion layer.

It is preferable that the base material film includes an oxygen barrier layer including at least one inorganic layer formed in contact with a surface of the base material film on the wavelength conversion layer side. Examples of such an inorganic layer include an inorganic layer containing a silicon oxide, a silicon nitride, a silicon carbide, or an aluminum oxide.

In addition, the oxygen barrier layer may include at least one organic layer between the base material film and the inorganic layer, and may include at least one organic layer on a surface of the inorganic layer on a side opposite to a surface on a base material film side.

In this specification, the "inorganic layer" is a layer containing an inorganic material as a main component, and is preferably a layer formed only of an inorganic material. In contrast, the "organic layer" is a layer containing an organic material as a main component, and indicates a layer containing an organic material of preferably greater than or equal to 50 mass %, more preferably greater than or equal to 80 mass %, and particularly preferably greater than or equal to 90 mass %.

It is preferable that in the base material film including the oxygen barrier layer, an absorbance of light at a wavelength of 450 nm measured by using an integrating sphere is less than 4.0%, and a total light ray transmittance is less than 92%.

It is preferable that the base material film includes an irregularity imparting layer imparting an irregular structure to a surface of the base material film on a side opposite to the wavelength conversion layer side. In addition, an optical diffusion layer may be provided on a surface of the base material film on a side opposite to the wavelength conversion layer side.

It is preferable that the base material film is provided on both main surfaces of the wavelength conversion layer.

It is preferable that an average film thickness of the base material film is less than or equal to 40 μm.

Here, the average film thickness of the base material film is a film thickness obtained by averaging film thicknesses of 5 or more different points on the base material film. The film thickness of the base material film, for example, can be measured by using an electric micrometer "K-402B" manufactured by ANRITSU CORPORATION.

A base material film containing polyethylene terephthalate is preferable as the base material film.

A backlight unit of the present invention is a backlight unit, comprising: a planar light source allowing primary light to exit; the wavelength conversion member of the present invention described above which is provided on the planar light source; a retroreflective member disposed to face the planar light source with the wavelength conversion member sandwiched therebetween; and a reflection plate disposed to face the wavelength conversion member with the planar light source sandwiched therebetween, in which the wavelength conversion member emits the fluorescent light by using at least a part of the primary light exiting from the planar light source as exciting light, and allows at least light including secondary light formed of the emitted fluorescent light to exit.

A liquid crystal display device of the present invention is a liquid crystal display device, comprising: the backlight unit of the present invention described above; and a liquid crystal unit disposed to face the backlight unit on the retroreflective member side.

In addition, in this specification, a "half-width" of a peak indicates the width of a peak at a height of ½ of a peak height. In addition, light having a light emission center wavelength in a wavelength range of 430 to 480 nm will be referred to as blue light, light having a light emission center wavelength in a wavelength range of 500 to 600 nm will be referred to as green light, and light having a light emission center wavelength in a wavelength range of 600 to 680 nm will be referred to as red light.

The wavelength conversion member of the present invention is the wavelength conversion member including the wavelength conversion layer containing at least one type of quantum dot which is excited by the exciting light and emits the fluorescent light, and the base material film on at least one surface of the wavelength conversion layer, in which the absorbance of the light at the wavelength of 450 nm measured by using the integrating sphere is less than 0.9%, and the total light ray transmittance is less than 92%. According to such a configuration, it is possible to provide a wavelength conversion member having a small optical loss.

DESCRIPTION OF THE PREFERRED EMBODIMENTS

Figure 1:
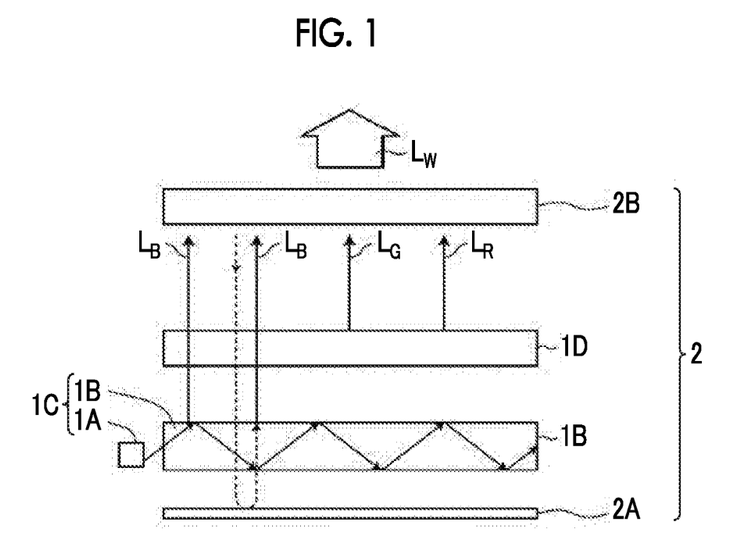
FIG. 1 is a cross-sectional view of a schematic configuration of a backlight unit including a wavelength conversion member of an embodiment according to the present invention.
Figure 2:
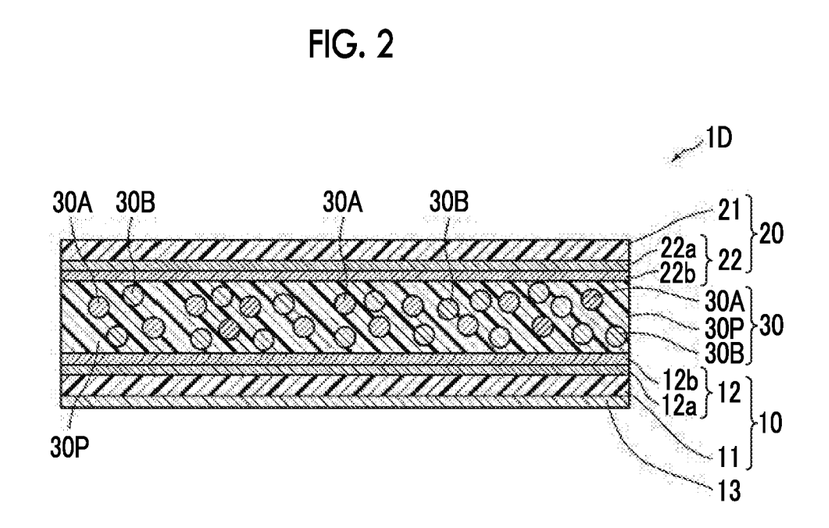
FIG. 2 is a cross-sectional view of a schematic configuration of the wavelength conversion member of the embodiment according to the present invention.

A wavelength conversion member of an embodiment according to the present invention and a backlight unit including the wavelength conversion member will be described with reference to the drawings. FIG. 1 is a cross-sectional view of a schematic configuration of a backlight unit including the wavelength conversion member of this embodiment, and FIG. 2 is a cross-sectional view of a schematic configuration of the wavelength conversion member of this embodiment. In the drawings of this specification, each unit is illustrated by suitably changing a reduction scale in order to improve visibility. Furthermore, in this specification, a numerical range represented by using "to" indicates a range including numerical values before and after "to" as the lower limit value and the upper limit value.

As illustrated in FIG. 1, a backlight unit 2 includes a planar light source 1C formed of a light source 1A which allows primary light (blue light $L_B$) to exit and a light guide plate 1B which guides the primary light exiting from the light source 1A and allows the guided primary light to exit; a wavelength conversion member 1D provided on the planar light source 1C; a retroreflective member 2B disposed to face the planar light source 1C with the wavelength conversion member 1D sandwiched therebetween; and a reflection plate 2A disposed to face the wavelength conversion member 1D with the planar light source 1C sandwiched therebetween, and the wavelength conversion member 1D emits fluorescent light by using at least a part of the primary light $L_B$ exiting from the planar light source 1C as exciting light, and allows secondary light rays ($L_G$ and $L_R$) formed of the fluorescent light and the primary light $L_B$ transmitted through the wavelength conversion member 1D to exit.

As illustrated in FIG. 2, the wavelength conversion member 1D includes a wavelength conversion layer 30 containing a quantum dot which is excited by exciting light and emits fluorescent light, and substrate films 11 and 21 provided on both surfaces of the wavelength conversion layer 30, and oxygen barrier layers 12 and 22 including organic layers 12a and 22a and inorganic layers 12b and 22b are formed on surfaces of the base material films 11 and 21 on the wavelength conversion layer 30 side in contact with the base material films 11 and 21. In addition, the base material film 11 includes an irregularity imparting layer 13 imparting an irregular structure on a surface on a side opposite to the wavelength conversion layer 30 side. In this embodiment, the irregularity imparting layer (a mat layer) 13 also has a function as an optical diffusion layer.

The wavelength conversion layer 30 is formed by dispersing quantum dots 30A which are excited by the blue light $L_B$ and emit the fluorescent light (red light) $L_R$ and quantum dots 30B which are excited by the blue light $L_B$ and emit the fluorescent light (green light) $L_G$ in an organic matrix 30P. Furthermore, in FIG. 2, the quantum dots 30A and 30B are enlargedly illustrated in order to improve visibility, but actually, for example, the diameter of the quantum dot is approximately 2 to 7 nm with respect to the thickness of the wavelength conversion layer 30 of 50 to 100 µm.

In FIG. 1, $L_B$, $L_G$, and $L_R$ exiting from the wavelength conversion member 1D are incident on the retroreflective member 2B, and each of the incident light rays is repeatedly reflected between the retroreflective member 2B and the reflection plate 2A, and is transmitted through the wavelength conversion member 1D a plurality of times. As a result thereof, in the wavelength conversion member 1D, a sufficient amount of exciting light (the blue light $L_B$) is absorbed by the quantum dots 30A and 30B, and a necessary amount of fluorescent light rays ($L_G$ and $L_R$) is emitted, and thus, white light $L_W$ is realized and exits from the retroreflective member 2B.

At this time, an optical loss of the base material films 11 and 21 included in the wavelength conversion member 1D is integrated by the repeated reflection, and thus, increases. Accordingly, in a backlight unit which is designed such that the number of times of repetition increases, such as a backlight unit in which a use amount of the quantum dot contained in the wavelength conversion layer is reduced, the optical loss of the base material films 11 and 12 considerably affects the tint or the brightness of the white light $L_W$.

A quantum dot containing cadmium and selenium is excellent as the quantum dot used in the wavelength conversion member from the viewpoint of the highness of a light emission quantum yield or a light emission wavelength, and can be preferably used in the wavelength conversion member, but a use amount of the material thereof is strictly limited from the viewpoint of environmental safety. Accordingly, it is desirable that the use amount of the quantum dot contained in the wavelength conversion layer is reduced. In order to realize the equivalent tint and brightness while reducing the use amount of the quantum dot, it is necessary to repeat more retroreflection. That is, it is necessary to minimize the optical loss of the base material films 11 and 12.

On the other hand, as described in "SUMMARY OF THE INVENTION", in the related art, the optical film having transparency as high as possible is required as the base material film, and the base material film having a high total light ray transmittance is used. Further, in order to increase the total light ray transmittance, the surface of the base material film is attempted to be subjected to an antireflection treatment. However, it is confirmed that even in a case of using the film having a high total light ray transmittance as the base material film, there is not only a case where the brightness of the backlight unit is not improved, but there is also a case where the brightness further decreases, in the wavelength conversion member containing the quantum dot.

The present inventors have conducted intensive studies with respect to a factor of causing such a phenomenon and a solution thereof. As a result thereof, the present inventors have assumed the reason as described below.

The total light ray transmittance which is an index generally used for evaluating the transparency of the optical film is defined by the amount of light which is transmitted through a film by irradiating the film with a light ray, and an optical loss on the surface of the film due to light reflection and an optical loss in the film due to light absorption are included in transmission light.

Accordingly, in a case where the optical loss due to the reflection is large, the total light ray transmittance is a low value even though the optical loss due to the absorption is extremely small, and normally, it is determined that such a film has low transparency, and thus, is not preferable as the optical film.

However, in the wavelength conversion member, as described above, the white light is realized by repeating the reflection between the retroreflective member and the reflection plate a plurality of times, and thus, light reflected on the surface of the base material film is reflected again on other members, and can be used for exciting the quantum dot without becoming an optical loss. Accordingly, even in a case where the reflection on the surface of the base material film is considerable in some measure, the brightness of the backlight unit is not reduced. That is, even in a case of using a film having a low total light ray transmittance, there is a case where the film is preferable as the base material film of the wavelength conversion member. In addition, even in a case of using a film having a comparatively high total light ray transmittance, there is a case where the film is not preferable as the base material film of the wavelength conversion member in a case where the reflection on the surface of the base material film is reduced, and the optical loss of the film due to the absorption is large.

Further, as described above, in order to realize the equivalent tint and brightness while reducing the use amount of the quantum dot, it is necessary to repeat more retroreflection, and thus, there is also a case where is preferable that the reflection on the surface of the base material film increases. That is, in the base material film, an absorbance of light at a wavelength of 450 nm measured by using an integrating sphere is less than 0.9%, and the total ray transmittance is less than 92%. In a case where the absorbance of the light at the wavelength of 450 nm measured by using the integrating sphere is less than 0.9%, and the total light ray transmittance is less than 92%, the reflection on the surface of the film increases, the efficiency of the retroreflection is improved, and thus, it is possible to obtain a higher-brightness backlight unit by using a small amount of quantum dot.

For example, in a polyethylene terephthalate film which is generally used as the optical film, a reflectivity on the surface is high compared to a triacetyl cellulose film which is also generally used as the optical film, and thus, the total light ray transmittance becomes a low value. Nevertheless, the present inventors have confirmed that in a case where the polyethylene terephthalate film is used as the base material film of the wavelength conversion member, the brightness increases compared to a case where the triacetyl cellulose film is used.

As described above, the present inventors have found that the transparency of the base material film of the wavelength conversion member is required to be evaluated by the absorbance of the light measured by disposing a sample in the integrating sphere according to means described below, but not by the total light ray transmittance. In the integrating sphere, light reflected on the surface of the sample is also reflected again on the integrating sphere, and is finally detected by a measurement machine, and thus, in a system where the reflection is repeated a plurality of times without being affected by the reflection on the surface of the sample, the amount of light which is absorbed by the sample can be accurately evaluated by this method.

As a result of repeated studies of the present inventors, it has been found that in the base material film of the wavelength conversion member, the absorbance of the light measured by using the integrating sphere is required to be less than 0.9%, and thus, the present invention, has been completed.

That is, in the wavelength conversion member 1D of this embodiment, the absorbance of the light at the wavelength of 450 nm measured by using the integrating sphere is less than 0.9% in the substrate films 11 and 21 provided on both surfaces of the wavelength conversion layer 30.

Hereinafter, each constituent of the wavelength conversion member 1D will be described.

[Wavelength Conversion Member]

(Base Material Film)

As described above, in the base material films 11 and 21 used in the wavelength conversion member 1D, the absorbance of the light at the wavelength of 450 nm measured by using the integrating sphere is less than 0.9%. In the base material films 11 and 21, the absorbance of the light at the wavelength of 450 nm measured by using the integrating sphere is preferably less than 0.7%, and is more preferably less than 0.5%.

In addition, the total light ray transmittance of the base material films 11 and 21 is less than 92%. It has been found that the total light ray transmittance of the base material films 11 and 21 is more preferably less than or equal to 91%, and is even more preferably less than or equal to 90%. In a case of using a film in which the absorbance of the light at the wavelength of 450 nm measured by using the integrating sphere is less than 0.9% and the total light ray transmittance is less than 92%, a reflectivity of light on the surface of the film is comparatively high, and it is possible to increase the number of times of transmission of the exciting light through the wavelength conversion layer in a case of being incorporated in the wavelength conversion member, and thus, it is possible to decrease the concentration of the quantum dot in the wavelength conversion layer or to reduce the thickness of the wavelength conversion layer while suitably maintaining a display color of an LCD and suppressing a decrease in a brightness.

In order to further reduce the concentration of the quantum dots 30A and 30B contained in the wavelength conversion layer 30 or to further reduce the thickness of the wavelength conversion layer 30, it is necessary to further increase the number of times of the transmission of the exciting light through the wavelength conversion layer by providing means for increasing retroreflection of light, such as disposing a plurality of prism sheets on the retroreflective member 2B of the backlight unit to maintain the display color of the LCD. According to the wavelength conversion member 1D, even in a case where the number of times of the transmission of the exciting light through the wavelength conversion layer increases, in the base material films 11 and 21, the absorbance of the light at the wavelength of 450 nm measured by using the integrating sphere is less than 0.9%, and thus, does not considerably decrease the brightness of the LCD.

The base material films 11 and 21 may be layers adjacent to or directly in contact with the wavelength conversion layer, and may be included as base material films of an oxygen barrier film 10 or 20 described below. In addition, in the wavelength conversion member 1D, at least one main surface of the wavelength conversion layer 30 is supported by the base material film 11 or 21. Here, the "main surface" indicates the surface (a front surface or a back surface) of the wavelength conversion layer disposed on a visible side or a backlight side at the time of using the wavelength conversion member. The same applies to main surfaces of other layers or members.

In the wavelength conversion layer 30, as with this embodiment, it is preferable that a front main surface and a back main surface of the wavelength conversion layer 30 are supported by the base material film 11 or 21.

The average film thickness of the base material films 11 and 21 is preferably less than or equal to 40 µm, and is even more preferably less than or equal to 25 µm. In an aspect of increasing the retroreflection of the light, such as the case of reducing the concentration of the quantum dots 30A and 30B contained in the wavelength conversion layer 30 or the case of reducing the thickness of the wavelength conversion layer 30 described above, it is preferable that the thickness of the base material film is thin since it is possible to further reduce the absorbance of the light at the wavelength of 450 nm measured by using the integrating sphere and to suppress a decrease in the brightness. In addition, it is preferable that the thickness of the base material film is greater than or equal to 10 µm from the viewpoint of impact resistance or the like of the wavelength conversion member.

In addition, in the base material films 11 and 21, it is preferable that in-plane retardation Re (589) at a wavelength of 589 nm is less than or equal to 1,000 nm. The in-plane retardation Re (589) at the wavelength of 589 nm is more preferably less than or equal to 500 nm, and is even more preferably less than or equal to 200 nm.

When the presence or absence of impurities or defects is examined after the wavelength conversion member 1D is prepared, observation is performed by arranging two polarizing plates in an extinction position, and by inserting a wavelength conversion member between the polarizing plates, and thus, the impurities or the defects are easily observed. It is preferable that Re (589) of the base material film in the range described above since the impurities or the defects are more easily observed at the time of performing the examination using the polarizing plate.

Here, Re (589) is measured by allowing light at a wavelength of 589 nm to be incident in a film normal direction, by using KOBRA 21ADH or WR (manufactured by Oji Scientific Instruments). In selection of a measurement wavelength of λ nm, measurement can be performed by manually exchanging a wavelength selective filter or by converting a measured value with a program or the like.

A base material film having oxygen barrier properties is preferable as the base material films 11 and 21. Preferred examples of such a base material film include a polyethylene terephthalate film, a film formed of a polymer having a cyclic olefin structure, a polystyrene film, and the like.

(Oxygen Barrier Layer)

It is preferable that the base material films 11 and 21 include oxygen barrier layers 12 and 22 including at least one inorganic layer 12b and at least one inorganic layer 22b formed in contact with the surface on the wavelength conversion layer 30 side.

As illustrated in FIG. 2, the oxygen barrier layers 12 and 22 may include at least one organic layer 12a and at least one organic layer 22a between the base material films 11 and 21 and the inorganic layers 12b and 22b. The organic layers 12a and 22a may be disposed between the inorganic layers 12b and 22b and the wavelength conversion layer 30. Laminating a plurality of layer is preferable from the viewpoint of improving light resistance, since it is possible to further increase barrier properties.

The oxygen barrier layers 12 and 22 are formed by forming the base material films 11 and 21 on the surfaces thereof as a support. Accordingly, the oxygen barrier films 10 and 20 are configured of the base material films 11 and 21, and the oxygen barrier layers 12 and 22 disposed thereon. In a case where the oxygen barrier layers 12 and 22 are disposed, it is preferable that the base material film has high heat resistance. In the wavelength conversion member 1D, a layer in the oxygen barrier films 10 and 20, which is adjacent to the wavelength conversion layer 30, may be an inorganic layer or an organic layer, but is not particularly limited.

It is preferable that oxygen permeabilities of the oxygen barrier films 10 and 20 are less than or equal to 1.00 cm$^3$/(m$^2$·day·atm). Here, the oxygen permeability described above is a value measured by using an oxygen gas permeability measurement device (manufactured by manufactured by MOCON, Inc., Inc., OX-TRAN 2/20: Product Name) under conditions of a measurement temperature of 23° C. and relative humidity of 90%. The oxygen permeabilities of the oxygen barrier films 10 and 20 are more preferably less than or equal to 0.10 cm$^3$/(m$^2$·day·atm), and are even more preferably less than or equal to 0.01 cm$^3$/(m$^2$·day·atm). It is preferable that the oxygen barrier films 10 and 20 have a function of blocking water vapor in addition to a gas barrier function of blocking oxygen.

[Inorganic Layer]

The inorganic layers 12b and 22b preferable to the oxygen barrier layers 12 and 22 are not particularly limited, and various inorganic compounds such as a metal, an inorganic oxide, a nitride, and an oxynitride can be used as the inorganic layers 12b and 22b. Silicon, aluminum, magnesium, titanium, tin, indium, and cerium are preferable as an element configuring the inorganic material, and one type or two or more types thereof may be contained. Specific examples of the inorganic compound can include silicon oxide, silicon oxynitride, aluminum oxide, magnesium oxide, titanium oxide, tin oxide, an indium oxide alloy, silicon nitride, aluminum nitride, and titanium nitride. In addition, a metal film, for example, an aluminum film, a silver film, a tin film, a chromium film, a nickel film, and a titanium film may be disposed as the inorganic layer.

In the materials described above, an inorganic layer containing silicon oxide, silicon nitride, silicon oxynitride, silicon carbide, or aluminum oxide is particularly preferable. The inorganic layer formed of such a material has excellent adhesiveness with respect to the organic layer, and thus, even in a case where a pinhole is formed on the inorganic layer, it is possible to effectively fill the pinhole with the organic layer and to further increase the barrier properties.

In addition, silicon nitride is most preferable from the viewpoint of suppressing light absorption in the oxygen barrier layer.

A formation method of the inorganic layer is not particularly limited, and for example, various film formation methods can be used in which a film formation material can be deposited on a surface to be subjected to vapor deposition by being evaporated or scattered.

Examples of the formation method of the inorganic layer include a physical vapor deposition method (a PVD method) such as a vacuum vapor deposition method in which vapor deposition is performed by heating an inorganic material such as an inorganic oxide, an inorganic nitride, an inorganic oxynitride, and a metal; an oxidation reaction vapor deposition method in which vapor deposition is performed by using an inorganic material as a raw material, by introducing oxygen gas, and by performing oxidation; a sputtering method in which vapor deposition is performed by using an inorganic material as a target raw material, by introducing argon gas and oxygen gas, and by performing sputtering; and an ion plating method in which vapor deposition is performed by heating an inorganic material with a plasma beam generated from a plasma gun, a plasma chemical vapor deposition method in which an organic silicon compound is used as a raw material in a case where a vapor-deposited film of silicon oxide is formed, and the like.

The thickness of the inorganic layer may be I am to 500 nm, is preferably 5 nm to 300 nm, and is particularly preferably 10 nm to 150 nm. This is because it is possible to suppress the light absorption in the inorganic layer while realizing excellent barrier properties and to provide a wavelength conversion member having a higher light transmittance by setting the thickness of the adjacent inorganic layer to be in the range described above.

[Organic Layer]

The organic layer can be referred to paragraphs 0020 to 0042 of JP2007-290369A and paragraphs 0074 to 0105 of JP2005-096108A. Furthermore, it is preferable that the organic layer contains a CARDO polymer. Accordingly, adhesiveness between the organic layer and the adjacent layer, in particular, adhesiveness between the organic layer and the inorganic layer becomes excellent, and thus, it is possible to realize more excellent gas barrier properties. The details of the CARDO polymer can be referred to paragraphs 0085 to 0095 of JP2005-096108A described above. A film thickness of the organic layer is preferably in a range of 0.05 µm to 10 µm, and among them, a range of 0.5 to 10 µm is preferable. In a case where the organic layer is formed by a wet coating method, the film thickness of the organic layer is in a range of 0.5 to 10 µm, and among them, a range of 1 µm to 5 µm is preferable. In addition, in a case where the organic layer is formed by a dry coating method, the film thickness of the organic layer is in a range of 0.05 µm to 5 µm, and among them, a range of 0.05 µm to 1 µm is preferable. This is because it is possible to make the adhesiveness with respect to the inorganic layer more excellent by setting the film thickness of the organic layer which is formed by the wet coating method or the dry coating method to be in the range described above.

The other details of the inorganic layer and the organic layer can be referred to the descriptions of JP2007-290369A and JP2005-096108A described above, and US2012/0113672A1.

(Irregularity Imparting Layer (Mat Layer))

It is preferable that the base material films 11 and 21 include the irregularity imparting layer (the mat layer) imparting an irregular structure on the surface on the side opposite to the wavelength conversion layer 30 side. It is preferable that the base material film includes the mat layer since it is possible to improve blocking properties and slidability of the base material film. It is preferable that the mat layer is a layer containing particles. Examples of the particles include inorganic particles such as silica, alumina, and metal oxide, organic particles such as cross-linked polymer particles, or the like. In addition, it is preferable that the mat layer is disposed on the surface of the base material film on the side opposite to the wavelength conversion layer, or the mat layer may be disposed on both surfaces.

(Optical Diffusion Layer)

The wavelength conversion member 1D can have an optical diffusion function in order to efficiently extract the fluorescent light from the quantum dot to the outside. The optical diffusion function may be provided in the wavelength conversion layer 30, or a layer having an optical diffusion function may be separately disposed as the optical diffusion layer.

It is also preferable that scattering particles are added into the wavelength conversion layer, as an aspect. In addition, it is also preferable that the scattering particles are disposed on the surface of the base material film on the side opposite to the wavelength conversion layer, as another aspect. In a case where both of the mat layer described above and the optical diffusion layer are disposed, as with this embodiment, a layer which can be used as both of the irregularity imparting layer and the optical diffusion layer is preferable. Scattering in the optical diffusion layer may be performed by the scattering particles, or may be performed by surface irregularity.

(Wavelength Conversion Layer)

As described above, the quantum dots 30A which are excited by the blue light $L_B$ and emit the fluorescent light (the red light) $L_R$ and the quantum dots 30B which are excited by the blue light $L_B$ and emit fluorescent light (the green light) $L_G$ are dispersed in the organic matrix 30P of the wavelength conversion layer 30.

In addition, the quantum dots 30A which are excited by ultraviolet light $L_{UV}$ and emit the fluorescent light (the red light) $L_R$, the quantum dots 30B which are excited by the ultraviolet light $L_{UV}$ and emit the fluorescent light (the green light) $L_G$, and quantum dots 30C which are excited by the ultraviolet light $L_{UV}$ and emit the fluorescent light (the blue light) $L_B$ can also be dispersed in the organic matrix 30P of the wavelength conversion layer 30.

The organic matrix 30P includes a polymer, and the wavelength conversion layer 30 can be formed of a quantum dot-containing polymerizable composition which contains the quantum dots 30A, 30B, and 30C, and a polymerizable compound. That is, it is preferable that the wavelength conversion layer 30 is a cured layer obtained by curing the quantum dot-containing polymerizable composition. The shape of the wavelength conversion layer is not particularly limited, and the wavelength conversion layer can have an arbitrary shape.

The quantum dot can include two or more types of quantum dots having different light emission properties, and in this embodiment, the quantum dot is the quantum dot 30A which is excited by the blue light $L_B$ and emits the fluorescent light (the red light) $L_R$ and the quantum dot 30B which is excited by the blue light $L_B$ and emits the fluorescent light (the green light) $L_G$. In addition, the quantum dot can include the quantum dot 30A which is excited by the ultraviolet light $L_{UV}$ and emits the fluorescent light (the red light) $L_R$, the quantum dot 30B which is excited by the ultraviolet light $L_{UV}$ and emits the fluorescent light (the green light) $L_G$, and the quantum dot 30C which is excited by the ultraviolet light $L_{UV}$ and emits the fluorescent light (the blue light) $L_B$.

The quantum dot 30A having a light emission center wavelength in a wavelength range of 600 nm to 680 nm, the quantum dot 30B having a light emission center wavelength in a wavelength range of 500 nm to 600 nm, and the quantum dot 30C (emitting the blue light) having a light emission center wavelength in a wavelength range of 400 nm to 500 nm are known as a known quantum dot.

In this embodiment, in a case where the blue light $L_B$ is incident on the wavelength conversion layer 30 containing the quantum dot 30A and the quantum dot 30B as the exciting light, as illustrated in FIG. 1, white light can be realized by the red light $L_R$ emitted from the quantum dot 30A, the green light $L_G$ emitted from the quantum dot 30B, and the blue light $L_B$ transmitted through the wavelength conversion layer 30.

In a case where the ultraviolet light is used as the exciting light, the ultraviolet light is incident on the wavelength conversion layer 30 containing the quantum dots 30A, 30B, and 30C as the exciting light, and thus, white light can be realized by the red light emitted from the quantum dot 30A, the green light emitted from the quantum dot 30B, and the blue light emitted from the quantum dot 30C.

The quantum dot, for example, can be referred to paragraphs 0060 to 0066 of JP2012-169271A in addition to the above description, but is not limited thereto.

For example, core-shell type semiconductor nanoparticles are preferable as the quantum dot, from the viewpoint of improving durability. Group II-VI semiconductor nanoparticles, group III-V semiconductor nanoparticles, multi-semiconductor nanoparticles, and the like can be used as the core. Specifically, examples of the core include CdSe, CdTe, CdS, ZnS, ZnSe, ZnTe, InP, InAs, InGaP, and the like, but are not limited thereto. Among them, CdSe, CdTe, InP, and InGaP are preferable from the viewpoint of emitting visible light with a high efficiency. CdS, ZnS, ZnO, GaAs, and a composite thereof can be used as the shell, but the shell is not limited thereto. A light emission wavelength of the quantum dot, in general, can be adjusted by the composition and the size of the particles.

The quantum dot may be spherical particles, may be rod-like particles which are also referred to as quantum rods, and may be tetrapod type particles. A spherical quantum dot or a rod-like quantum dot (that is, the quantum rod) is preferable from the viewpoint of narrowing a light emission half-width (FWHM) and widening a color reproduction range of a liquid crystal display device.

A ligand having a LEWIS basic coordinating group may be coordinated on the surface of the quantum dot. Examples of the LEWIS basic coordinating group can include an amino group, a carboxy group, a mercapto group, a phosphine group, a phosphine oxide group, and the like. Specifically, hexyl amine, decyl amine, hexadecyl amine, octadecyl amine, oleyl amine, myristyl amine, lauryl amine, oleic acid, mercaptopropionic acid, trioctyl phosphine, trioctyl phosphine oxide, and the like can be included. Among them, hexadecyl amine, trioctyl phosphine, and trioctyl phosphine oxide are preferable, and trioctyl phosphine oxide is particularly preferable.

The quantum dot coordinated with the ligand can be prepared by a known synthesis method. For example, can be synthesized by a method described in C. B. Murray, D. J. Norris, M. G. Bawendi, Journal American Chemical Society, 1993, 115(19), pp, 8706-8715 or The Journal Physical Chemistry, 101, pp. 9463-9475, 1997. In addition, a commercially available quantum dot can be used as the quantum dot coordinated with the ligand without any limitation. Examples of the commercially available quantum dot can include LUMIDOT (manufactured by Sigma-Aldrich. Co. LLC.).

The thickness of the wavelength conversion layer 30 is preferably in a range of 1 to 500 µm, is more preferably in a range of 10 to 250 µm, and is even more preferably in a range of 30 to 150 µm. It is preferable that the thickness is greater than or equal to 1 µm since it is possible to obtain a high wavelength conversion effect. In addition, it is preferable that the thickness is less than or equal to 500 µm since it is possible to thin the backlight unit in a case of being incorporated in the backlight unit.

The wavelength conversion member 1D is configured as described above.

The wavelength conversion member 1D includes the wavelength conversion layer 30 containing the quantum dot which is excited by the exciting light $L_B$ and emits the fluorescent light rays $L_R$ and $L_G$, and includes the base material films 11 and 21 on at least one surface of the wavelength conversion layer 30, in which the absorbance of the light at the wavelength of 450 nm measured by using the integrating sphere is less than 0.9%. According to such a configuration, it is possible to obtain the wavelength conversion member 1D in which the optical loss is small.

In addition, in order to further reduce the concentration of the quantum dots 30A and 30B contained in the wavelength conversion layer 30 or to further reduce the thickness of the wavelength conversion layer 30, even in a case of further increasing the number of times of the transmission of the exciting light through the wavelength conversion layer by providing means for increasing retroreflection of light, such as disposing a plurality of prism sheets on the retroreflective member 2B of the backlight unit to maintain the display color of the LCD, the base material films 11 and 21 satisfy the absorbance described above, and thus, the wavelength conversion member 1D which do not decrease the brightness of the LCD is obtained.

(Manufacturing Method of Wavelength Conversion Member)

Hereinafter, an example of a manufacturing method of the wavelength conversion member 1D described above in an aspect where the base material films 11 and 21 including the oxygen barrier layers 12 and 22 (hereinafter, referred to as oxygen barrier films 10 and 20) are provided on both surfaces of the wavelength conversion layer 30 will be described.

In this embodiment, the wavelength conversion layer 30 can be formed by applying the quantum dot-containing polymerizable composition onto the surface of the oxygen barrier films 10 and 20, and then, by curing the quantum dot-containing polymerizable composition by light irradiation or heating. Examples of the coating method include a known coating method such as a curtain coating method, a dip coating method, a spin coating method, a printing coating method, a spray coating method, a slot coating method, a roll coating method, a slide coating method, a blade coating method, a gravure coating method, and a wire bar method.

Curing conditions can be suitably set according to the type of polymerizable compound to be used or the composition of the polymerizable composition. In addition, in a case where the quantum dot-containing polymerizable composition is a composition containing a solvent, a drying treatment for removing the solvent may be performed before performing curing.

The quantum dot-containing polymerizable composition may be cured in a state where the quantum dot-containing polymerizable composition is sandwiched by two base material films. An aspect of a manufacturing step of the wavelength conversion member including such a curing treatment will be described below with reference to FIG. 3 and FIG. 4. However, the present invention is not limited to the following aspect.

Figure 3:
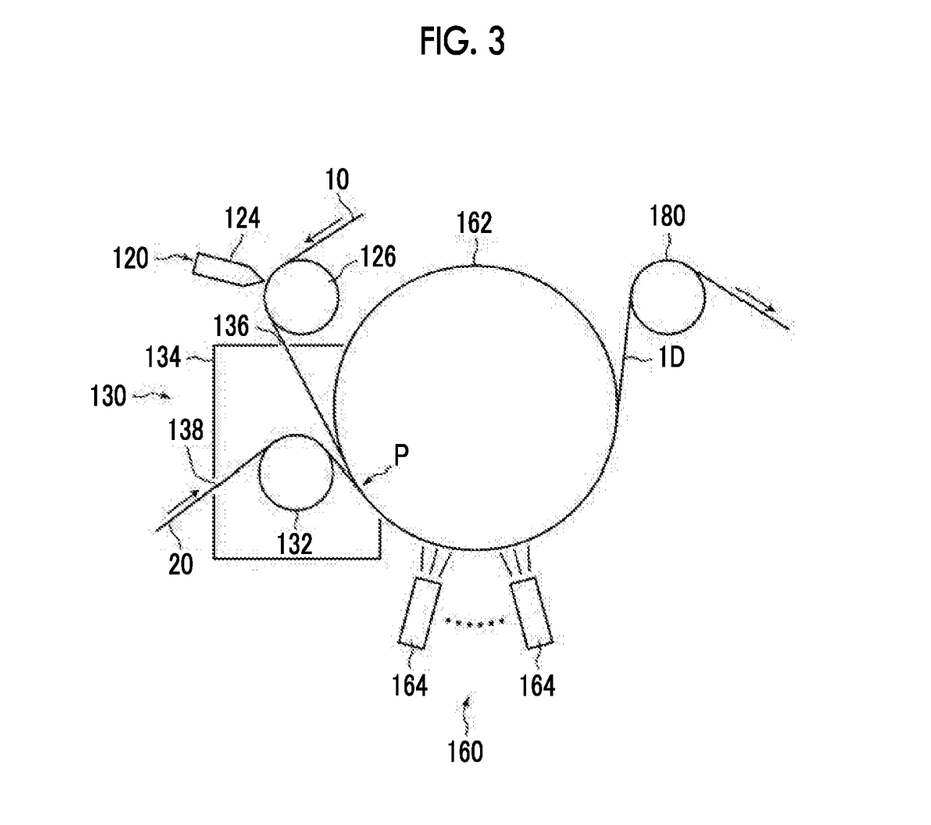
FIG. 3 is a schematic configuration diagram illustrating an example of a manufacturing device of the wavelength conversion member of the embodiment according to the present invention.
Figure 4:
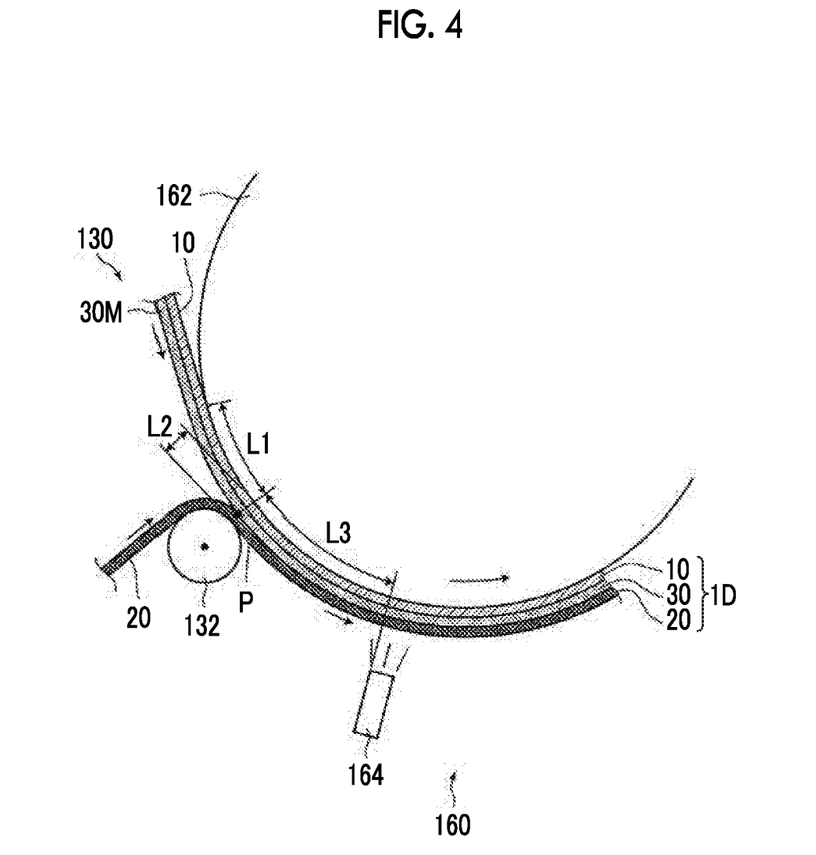
FIG. 4 is a partially enlarged view of the manufacturing device illustrated in FIG. 3.

FIG. 3 is a schematic configuration diagram of an example of a manufacturing device of the wavelength conversion member 1D, and FIG. 4 is a partially enlarged view of the manufacturing device illustrated in FIG. 3. The manufacturing step of the wavelength conversion member using the manufacturing device illustrated in FIGS. 3 and 4 includes at least a step of forming a coated film by applying the quantum dot-containing polymerizable composition onto a surface of a first oxygen barrier film 10 (hereinafter, referred to as a "first film") which is continuously handled, a step of laminating (superimposing) a second oxygen barrier film 20 (hereinafter, referred to as a "second film") which is continuously handled on the coated film and of sandwiching the coated film between the first film and the second film, and a step of winding any one of the first film and the second film around a backup roller in a state where the coated film is sandwiched between the first film and the second film, of performing light irradiation with respect to the coated film while continuously handling the film, of polymerizing and curing the coated film, and of forming a wavelength conversion layer (a cured layer). By using a barrier film having barrier properties with respect to oxygen or moisture as any one of the first film and the second film, it is possible to obtain a wavelength conversion member of which one surface is protected with the barrier film. In addition, by using a barrier film as each of the first film and the second film, it is possible to obtain a wavelength conversion member 1D in which both surfaces of a wavelength conversion layer are protected with the barrier film.

More specifically, first, the first film 10 is continuously handled to a coating unit 120 from a feeding machine (not illustrated). For example, the first film 10 is fed at a handling speed of 1 to 50 m/minute from the feeding machine. Here, the handling speed is not limited thereto. For example, a tensile force of 20 to 150 N/m, preferably a tensile force of 30 to 100 N/m is applied to the first film 10 at the time of being fed.

In the coating unit 120, the quantum dot-containing polymerizable composition (hereinafter, also referred to as a "coating liquid") is applied onto the surface of the first film 10 which is continuously handled, and thus, a coated film 30M (refer to FIG. 4) is formed. The coating unit 120, for example, includes a die coater 124, and a backup roller 126 disposed to face the die coater 124. A surface of the first film 10 on a side opposite to the surface on which the coated film 30M is formed is wound around a backup roller 126, and the coating liquid is applied onto the surface of the first film 10 which is continuously handled from an ejection port of the die coater 124, and thus, the coated film 30M is formed. Here, the coated film 30M indicates the quantum dot containing polymerizable composition applied onto the first film 10 before being cured.

In this embodiment, the die coater 124 to which an extrusion coating method is applied is described as a coating device, but the coating device is not limited thereto. For example, a coating device to which various methods such as a curtain coating method, an extrusion coating method, a rod coating method, or a roll coating method are applied can be used.

The first film 10 on which the coated film 30M is formed is continuously handled to a laminating unit 130 through the coating unit 120. In the laminating unit 130, the second film 20 which is continuously handled is laminated on the coated film 30M, and thus, the coated film 30M is sandwiched between the first film 10 and the second film 20.

The laminating unit 130 includes a laminating roller 132, and a heating chamber 134 surrounding the laminating roller 132. The heating chamber 134 includes an opening portion 136 for allowing the first film 10 to pass therethrough, and an opening portion 138 for allowing the second film 20 to pass therethrough.

A backup roller 162 is disposed in a position facing the laminating roller 132. In the first film 10 on which the coated film 30M is formed, the surface on a side opposite to the surface on which the coated film 30M is formed is wound around the backup roller 162, and is continuously handled to a lamination position P. The lamination position P indicates a position in which the second film 20 starts to be in contact with the coated film 30M. It is preferable that the first film 10 is wound around the backup roller 162 before reaching the lamination position P. This is because even in a case where wrinkles are generated on the first film 10, the wrinkles can be reformed and removed by the backup roller 162 until the first film 10 reaches the lamination position P. Therefore, it is preferable that a distance L1 between the position (a contact position) where the first film 10 is wound around the backup roller 162 and the lamination position P is long, and for example, the distance L1 is preferably greater than or equal to 30 mm, and the upper limit value, in general, is determined according to the diameter and a pass line of the backup roller 162.

In this embodiment, the second film 20 is laminated by the backup roller 162 which is used in a curing unit 160 and the laminating roller 132. That is, the backup roller 162 which is used in the curing unit 160 is also used as a roller which is used in the laminating unit 130. Here, the configuration is not limited to the above description, but a roller for lamination is disposed in the laminating unit 130, separately from the backup roller 162, such that the backup roller 162 is not also used as the roller which is used in the laminating unit 130.

By using the backup roller 162 which is used in the curing unit 160 in the laminating unit 130, it is possible to decrease the number of rollers. In addition, the backup roller 162 can also be used as a heat roller with respect to the first film 10.

The second film 20 fed from the feeding machine (not illustrated) is wound around the laminating roller 132, and is continuously handled between the laminating roller 132 and the backup roller 162. In the lamination position P, the second film 20 is laminated on the coated film 30M which is formed on the first film 10. Accordingly, the coated film 30M is sandwiched between the first film 10 and the second film 20. The lamination indicates that the second film 20 is laminated on the coated film 30M by being superimposed.

It is preferable that a distance L2 between the laminating roller 132 and the backup roller 162 is greater than or equal to the value of the total thickness of the first film 10, the wavelength conversion layer (the cured layer) 30 formed by polymerizing and curing the coated film 30M, and the second film 20. In addition, it is preferable that L2 is less than or equal to a length obtained by adding 5 mm to the total thickness of the first film 10, the coated film 30M, and the second film 20. By setting the distance L2 to be less than or equal to the length obtained by adding 5 mm to the total thickness, it is possible to prevent hubbies from entering between the second film 20 and the coated film 30M. Here, the distance L2 between the laminating roller 132 and the backup roller 162 indicates the shortest distance between an outer circumferential surface of the laminating roller 132 and an outer circumferential surface of the backup roller 162.

A rotation accuracy of the laminating roller 132 and the backup roller 162 is less than or equal to 0.05 mm, and is preferably less than or equal to 0.01 mm, in radial deflection. It is possible to decrease a thickness distribution of the coated film 30M as the radial deflection becomes small.

In addition, in order to suppress thermal deformation after sandwiching the coated film 30M between the first film 10 and the second film 20, a difference between the temperature of the backup roller 162 in the curing unit 160 and the temperature of the first film 10, and a difference between the temperature of the backup roller 162 and the temperature of the second film 20 are preferably lower than or equal to 30° C., and are more preferably lower than or equal to 15° C., and it is most preferable that the temperatures are identical to each other.

In a case where a heating chamber 134 is disposed in order to decrease the difference with respect to the temperature of the backup roller 162, it is preferable that the first film 10 and the second film 20 are heated in the heating chamber 134. For example, in the heating chamber 134, hot air is supplied by a hot air generating device (not illustrated), and thus, it is possible to heat the first film 10 and the second film 20.

The first film 10 is wound around the backup roller 162 of which the temperature is adjusted, and thus, the first film 10 may be heated by the backup roller 162.

On the other hand, in the second film 20, the laminating roller 132 is set to a heat roller, and thus, it is possible to heat the second film 20 by the laminating roller 132. Here, the heating chamber 134 and the heat roller are not essential constituents, and can be disposed as necessary.

Next, the coated film 30M is continuously handled to the curing unit 160 in a state where the coated film 30M is sandwiched between the first film 10 and the second film 20.

In the aspect illustrated in the drawing, the curing in the curing unit 160 is performed by light irradiation, and in a case where the polymerizable compound contained in the quantum dot-containing polymerizable composition is polymerized by heating, the curing can be performed by heating such as blowing off warm air.

A light irradiation device 164 is disposed in a position facing the backup roller 162. The first film 10 and the second film 20 sandwiching the coated film 30M therebetween are continuously handled between the backup roller 162 and the light irradiation device 164. Light emitted from the light irradiation device may be determined according to the type of photopolymerizable compound contained in the quantum dot-containing polymerizable composition, and examples of the light include an ultraviolet ray. Here, the ultraviolet ray indicates light at a wavelength of 280 to 400 nm. For example, a low pressure mercury lamp, a medium pressure mercury lamp, a high pressure mercury lamp, a super high pressure mercury lamp, a carbon arc lamp, a metal halide lamp, a xenon lamp, and the like can be used as a light source emitting an ultraviolet ray. Light irradiation dose may be set in a range where the coated film can be polymerized and cured, and for example, the coated film 30M can be irradiated with an ultraviolet ray having irradiation dose of 100 to 10,000 mJ/cm$^2$, as an example.

In the curing unit 160, the first film 10 is wound around the backup roller 162 in a state where the coated film 30M is sandwiched between the first film 10 and the second film 20, the coated film 30M is irradiated with the light from the light irradiation device 164 while being continuously handled, and the coated film 30M is cured, and thus, it is possible to form the wavelength conversion layer (the cured layer) 30.

In this embodiment, the first film 10 side is wound around the backup roller 162 and is continuously handled, but the second film 20 can be wound around the backup roller 162 and can be continuously handled.

Being wound around the backup roller 162 indicates a state where any one of the first film 10 and the second film 20 is in contact with the surface of the backup roller 162 at a certain warp angle. Therefore, the first film 10 and the second film 20 are moved in synchronization with the rotation of the backup roller 162 while being continuously handled. Being wound around the backup roller 162 may be performed while being irradiated with at least an ultraviolet ray.

The backup roller 162 includes a cylindrical main body, and a rotation axis disposed on both end portions of the main body. The main body of the backup roller 162, for example, has a diameter of ϕ200 to 1,000 mm. The diameter ϕ of the backup roller 162 is not limited. In consideration of curling deformation of a laminated film, facility costs, and a rotation accuracy, it is preferable that the diameter is ϕ300 to 500 mm. By attaching a temperature adjuster to the main body of the backup roller 162, it is possible to adjust the temperature of the backup roller 162.

The temperature of the backup roller 162 can be determined in consideration of heat generated at the time of performing light irradiation, a curing efficiency of the coated film 30M, and the occurrence of wrinkle deformation of the first film 10 and the second film 20 on the backup roller 162. The backup roller 162, for example, is preferably set to be in a temperature range of 10° C. to 95° C., and is more preferably set to be in a temperature range of 15° C. to 85° C. Here, the temperature relevant to the roller indicates a surface temperature of the roller.

It is possible to set a distance L3 between the lamination position P and the light irradiation device 164, for example, to be greater than or equal to 30 mm.

The coated film 30M becomes the cured layer 30 by light irradiation, and thus, a wavelength conversion member 1D including the first film 10, the cured layer 30, and the second film 20 is manufactured. The wavelength conversion member 1D is peeled off from the backup roller 162 by a peeling off roller 180. The wavelength conversion member 1D is continuously handled to a winder (not illustrated), and then, the wavelength conversion member 1D is wound in the shape of a roll by the winder.

As described above, the aspect of the manufacturing step of the wavelength conversion member 1D has been described, but the present invention is not limited to the aspect described above. For example, the quantum dot-containing polymerizable composition is applied onto the base material film such as the support or the oxygen barrier film, and is cured after the drying treatment which is performed as necessary, without laminating another base material on the base material film coated with the quantum dot-containing polymerizable composition, and thus, the wavelength conversion layer (the cured layer) may be formed. One or more other layers such as an inorganic layer can be laminated on the prepared wavelength conversion layer by a known method.

[Backlight Unit]

As described above, the backlight unit 2 illustrated in FIG. 1 includes the planar light source 1C formed of the light source 1A which allows the primary light (the blue light $L_B$) to exit and the light guide plate 1B which guides the primary light exiting from the light source 1A and allows the guided primary light to exit, the wavelength conversion member 1D provided on the planar light source 1C, the retroreflective member 2B disposed to face the planar light source 1C with the wavelength conversion member 1D sandwiched therebetween, and the reflection plate 2A disposed to face the wavelength conversion member 1D with the planar light source 1C sandwiched therebetween, and the wavelength conversion member 1D emits the fluorescent light by using at least a part of the primary light $L_B$ exiting from the planar light source 1C as the exciting light; and allows the secondary light rays ($L_G$ and $L_R$) formed of the fluorescent light and the primary light $L_B$ not formed of the exciting light to exit.

It is preferable that a backlight unit including a multi-wavelength light source is used as the backlight unit from the viewpoint of realizing a high brightness and a high color reproducibility. For example, it is preferable to emit blue light having a light emission center wavelength in a wavelength range of 430 to 480 nm and a light emission intensity peak of which the half-width is less than or equal to 100 nm, green light having a light emission center wavelength in a wavelength range of 500 to 600 nm and a light emission intensity peak of which the half-width is less than or equal to 100 nm, and red light having a light emission center wavelength in a wavelength range of 600 to 680 nm and a light emission intensity peak of which the half-width is less than or equal to 100 nm.

A wavelength range of the blue light emitted from the backlight unit 2 is preferably 430 to 480 nm, and is more preferably 440 to 460 nm, from the viewpoint of further improving the brightness and the color reproducibility.

From the same viewpoint, a wavelength range of the green light emitted from the backlight unit 2 preferably 520 to 560 nm, and is more preferably 520 to 545 nm.

In addition, from the same viewpoint, a wavelength range of the red light emitted from the backlight unit is preferably 600 to 680 nm, and is more preferably 610 to 640 nm.

In addition, from the same viewpoint, all half-widths of light emission intensities of each of the blue light, the green light, and the red light emitted from the backlight unit are preferably less than or equal to 80 nm, are more preferably less than or equal to 50 nm, are even more preferably less than or equal to 40 nm, and are further even more preferably less than or equal to 30 nm. Among them, it is particularly preferable that the half-width of each light emission intensity of the blue light is less than or equal to 25 nm.

The backlight unit 2 includes at least the planar light source 1C along with the wavelength conversion member 1D described above. Examples of the light source 1A include a light source emitting blue light having a light emission center wavelength in a wavelength range of 430 nm to 480 nm or a light source emitting ultraviolet light. A light emitting diode, a laser light source, or the like can be used as the light source LA.

As illustrated in FIG. 1, the planar light source 1C may be a planar light source formed of the light source 1A, and the light guide plate 1B which guides the primary light exiting from the light source 1A and allows the guided primary light to exit, or may be a planar light source in which the light source 1A and the wavelength conversion member 1D are arranged parallel to each other on the plane, and a diffusion plate 1E is provided instead of the light guide plate 1B. The former planar light source is generally referred to as an edge light mode backlight unit, and the latter planar light source is generally referred to as a direct backlight mode backlight unit.

(Configuration of Backlight Unit)

In FIG. 1, an edge light mode backlight unit including a light guide plate, a reflection plate, or the like as a constituent is illustrated as the configuration of the backlight unit, but the backlight unit may be a direct backlight mode backlight unit. A known light guide plate can be used as the light guide plate without any limitation.

In addition, the reflection plate 2A is not particularly limited, and known reflection plates described in JP3416302B, JP3363565B, JP4091978B, JP3448626B, and the like can be used, and the contents of the publications are incorporated in the present invention.

The retroreflective member 2B may be configured of a known diffusion plate or a known diffusion sheet, a known prism sheet (for example, BEF series manufactured by Sumitomo 3M Limited, and the like), a known light guide device, and the like. The configuration of the retroreflective member 2B is described in JP3416302B, JP3363565B, JP4091978B, JP3448626B, and the like, and the contents of the publications are incorporated in the present invention.

[Liquid Crystal Display Device]

Figure 5:
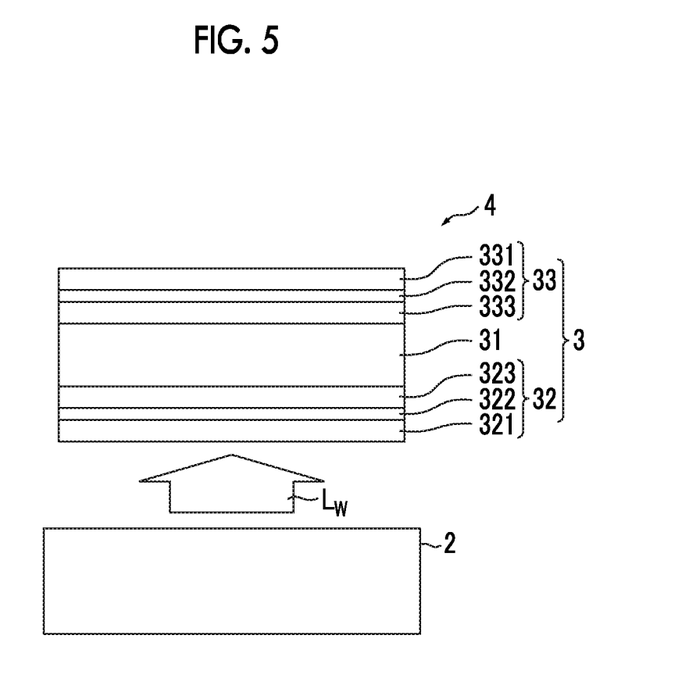
FIG. 5 is a cross-sectional view of a schematic configuration of a liquid crystal display device including a backlight unit of an embodiment according to the present invention.

The backlight unit 2 described above can be applied to a liquid crystal display device. As illustrated in FIG. 5, a liquid crystal display device 4 includes the backlight unit 2 of the embodiment described above, and a liquid crystal unit 3 disposed to face the backlight unit on the retroreflective member side.

As illustrated in FIG. 5, the liquid crystal unit 3 has a configuration in which a liquid crystal cell 31 is sandwiched between polarizing plates 32 and 33, and each of the polarizing plates 32 and 33 has a configuration in which both main surfaces of polarizers 322 and 332 are protected with polarizing plate protective films 321, 323, 331, and 333.

The liquid crystal cell 31 and the polarizing plates 32 and 33 configuring the liquid crystal display device 4 and the constituents thereof are not particularly limited, and members prepared by a known method or commercially available products can be used without any limitation. In addition, it is obviously possible to dispose a known interlayer such as an adhesive layer between the respective layers.

A driving mode of the liquid crystal cell 31 is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode can be used. It is preferable that the liquid crystal cell in the VA mode, in the OCB mode, in the IPS mode, or in the TN mode, but the mode of the liquid crystal cell is not limited thereto. Examples of the configuration of the liquid crystal display device in the VA mode include a configuration illustrated in FIG. 2 of JP2008-262161A. Here, a specific configuration of the liquid crystal display device is not particularly limited, and a known configuration can be adopted.

Further, as necessary, the liquid crystal display device 4 includes a subsidiary functional layer such as an optical compensation member performing optical compensation and an adhesive layer. In addition, a surface layer such as a forward scattering layer, a primer layer, an antistatic layer, and an undercoat layer may be disposed along with (or instead of) a color filter substrate, a thin layer transistor substrate, a lens film, a diffusion sheet, a hard coat layer, an antireflection layer, a low reflective layer, an antiglare layer, and the like.

The backlight side polarizing plate 32 may include a phase difference film as a polarizing plate protective film 323 on the liquid crystal cell 31 side. A known cellulose acylate film or the like can be used as such a phase difference film.

The backlight unit 2 and the liquid crystal display device 4 include the wavelength conversion member of the present invention described above in which the optical loss is small. Accordingly, the same effect as that of the wavelength conversion member of the present invention described above is obtained, and thus, a high-brightness backlight unit and a high-brightness liquid crystal display device are obtained.

EXAMPLES (Preparation of Oxygen Barrier Film PET1)

An oxygen barrier layer was formed on one surface side of a polyethylene terephthalate film (a PET film, Product Name: COSMOSHINE A4300 manufactured by TOYOBO CO., LTD., a thickness of 50 μm) in the following procedure. Furthermore, COSMOSHINE A4300 included a mat layer on both surfaces.

Trimethylol propane triacrylate (TMPIA manufactured by DAICEL-ALLNEX LTD.) and a photopolymerization initiator (ESACURE KTO46 manufactured by Lamberti S.p.A.) were prepared, were weighed to have a mass ratio of 95:5, and were dissolved in methyl ethyl ketone, and thus, a coating liquid having a concentration of solid contents of 15% was obtained. The coating liquid was applied onto the PET film described above in a roll-to-roll manner by using a die coater, and passed through a drying zone at 50° C. for 3 minutes. After that, the coating liquid was irradiated with an ultraviolet ray (integrated irradiation dose of approximately 600 mJ/cm$^2$) under a nitrogen atmosphere, was cured by UV curing, and was wound. A thickness of a first organic layer formed on the support film was 1 μm.

Next, an inorganic layer (a silicon nitride layer) was formed on the surface of the organic layer described above by using a roll-to-roll type chemical vapor deposition device (CVD device). Silane gas (a flow rate of 160 sccm), ammonia gas (a flow rate of 370 sccm), hydrogen gas (a flow rate of 590 sccm), and nitrogen gas (a flow rate of 240 sccm) were used as raw material gas. High frequency power having a frequency of 13.56 MHz was used as power. A film formation pressure was 40 Pa, and an arrival thickness was 50 nm. Thus, an oxygen barrier film PET1 was prepared in which the inorganic layer was laminated on the surface of the organic layer.

(Preparation of Oxygen Barrier Film PET2)

An oxygen barrier film PET2 was obtained by the same method as that of the PET1 except that the base material film was changed to another polyethylene terephthalate film (a PET film, Product Name: COSMOSHINE A4300 manufactured by TOYOBO CO., LTD., a thickness of 38 µm).

(Preparation of Oxygen Barrier Film COP1)

An oxygen barrier film COP1 was obtained by the same method as that of the PET1 except that the base material was changed to a ZEONOR film manufactured by Zeon Corporation (a cyclic olefin polymer film, a thickness of 32 µm).

(Preparation of Oxygen Barrier Film PS1)

0.3 wt % of antioxidant "Irganox 1010" was mixed into a commercially available syndiotactic polystyrene resin XAREC S105 (manufactured by Idemitsu Kosan Co., Ltd.), the mixture was melted and extruded at 300° C. by using a single screw extruder of 30 mm Φ, and was allowed to adhere to a cooling roll at 50° C. was performed by an electrostatic pinning method, and thus, an un-stretched film was formed. At this time, a screen filter, a gear pump, and a leaf disc filter were arranged in this order between an extruder and a die, the members were connected to a melting piping, and extrusion was performed from the die having a width of 450 mm and a leaf gap of 1 mm.

Next, the un-stretched film was stretched at a temperature of 115° C. and a stretching ratio of 3.8 times in a horizontal direction, and was subjected to a heat treatment for 10 seconds while being relaxed at 200° C. by 5% in a width direction, and a stretched film having a thickness of 53 µm was prepared, and thus, a stretched film B1 was obtained. An oxygen barrier film PS1 was obtained by the same method as that of the PET1 except that the stretched film B1 obtained as described above was used as the base material film.

(Preparation of Oxygen Barrier Film PEN1)

An oxygen barrier film PEN1 was obtained by the same method as that of the PS1 except that the resin was changed to polyethylene-2,6,-naphthalate (poly(ethylene naphthalate): PEN), and the thickness of the stretched film was changed to 40 µm.

(Preparation of Oxygen Barrier Film PC1)

An oxygen barrier film PC1 was obtained by the same method as that of the PET1 except that the base material was changed to a stretched polycarbonate film manufactured by Teijin. Limited (Product Name: PUREACE WR, W-159, a thickness of 93 urn).

(Preparation of Oxygen Barrier Film TAC1)

An oxygen barrier film TAC1 was obtained by the same method as that of the PET1 except that the base material was changed to TD80UL manufactured by Fujifilm Corporation (a triacetyl cellulose film, a thickness of 80 µm).

(Preparation of Quantum Dot-Containing Polymerizable Composition Used in Example 1)

A quantum dot-containing polymerizable composition 1 described below was prepared, was filtered through a polypropylene filter having a pore diameter of 0.2 µm, and then, was dried for 30 minutes under reduced pressure, and thus, was used as a coating liquid.

Hereinafter, CZ520-100 manufactured by NN-LABS, LLC was used as a quantum dot dispersion liquid 1 having a maximum light emission wavelength of 535 nm, and CZ620-100 manufactured by NN-LABS, LLC was used as a quantum dot dispersion liquid 2 having a maximum light emission wavelength of 630 nm. All of the quantum dots in the dispersion liquids were quantum dots containing CdSe as a core, ZnS as a shell, and octadecyl amine as a ligand, and were dispersed in toluene at a concentration of 3 mass %.

| Quantum Dot-Containing Polymerizable Composition 1 (Used in Example 1) | |
|---|---|
| Toluene Dispersion Liquid of Quantum Dot 1 (Maximum Light Emission: 535 nm) | 10 parts by mass |
| Toluene Dispersion Liquid of Quantum Dot 2 (Maximum Light Emission: 630 nm) | 1 part by mass |
| Lauryl Methacrylate | 40 parts by mass |
| Difunctional Methacrylate 4G (manufactured by Shin Nakamura Chemical Co., Ltd.) | 20 parts by mass |
| Trifunctional Acrylate TMPTA (manufactured by DAICEL-ALLNEX LTD.) | 20 parts by mass |
| Urethane Acrylate UA-160TM (manufactured by Shin Nakamura Chemical Co., Ltd.) | 10 parts by mass |
| Silane Coupling Agent KBM-5103 (manufactured by Shin-Etsu Chemical Co., Ltd.) | 10 parts by mass |
| Photopolymerization Initiator IRGACURE 819 (manufactured by BASF SE) | 1 part by mass |

(In the above description, a quantum dot concentration in the toluene dispersion liquid of the quantum dots 1 and 2 is 3 mass %)

(Preparation of Quantum Dot-Containing Polymerizable Composition Used in Examples 2 to 6 and Comparative Examples 1 to 4)

A quantum dot-containing polymerizable composition was prepared at a compositional ratio (a mass ratio) shown in Table 1, was filtered through a polypropylene filter having a pore diameter of 0.2 µm, and then, was dried for 30 minutes under reduced pressure, and thus, was used as a coating liquid.

Example 1

A first PET1 was prepared, the quantum dot-containing polymerizable composition 1 was applied onto the surface of the inorganic layer by a die coater while continuously handling the first PET1 at a speed of 1 m/minute and a tensile force of 60 N/m, and thus, a coated film having a thickness of 50 µm was formed. Subsequently, the first PET1 on which the coated film was formed was wound around a backup roller, a second PET1 was laminated on the coated film in a direction where the surface of the inorganic layer was in contact with the coated film, and the film passed through a heating zone at 100° C. for 3 minutes while being continuously handled in a state where the coated film was sandwiched between the first PET1 and the second PET1. After that, the quantum dot-containing polymerizable composition 1 was cured by being irradiated with an ultraviolet ray by using an air-cooled metal halide lamp (manufactured by EYE GRAPHICS CO., LTD.) of 160 W/cm, and thus, a wavelength conversion layer containing a quantum dot was formed. Irradiation dose of the ultraviolet ray was 2,000 mJ/cm$^2$.

Examples 2 to 6 and Comparative Examples 1 to 4

Wavelength conversion members of other examples and comparative examples were prepared by the same method as that in Example 1 except that the base material film or the barrier layer was changed as shown in Table 1.

(Evaluation of Brightness)

A commercially available tablet terminal (Kindle Fire HDX 7" manufactured by Amazon.com, Inc.) was disassembled, QDEF (manufactured by 3M Company, a quantum dot film) was taken out from a backlight unit, and the wavelength conversion member of each of the examples and the comparative examples which was cut out into the shape of a rectangle was incorporated instead of QDEF. Thus, a liquid crystal display device was prepared.

The prepared liquid crystal display device was turned on such that the entire surface was in white display, and measurement was performed by a brightness meter (SR3, manufactured by TOPCON CORPORATION) disposed in a position of 740 mm in a vertical direction with respect to a surface of a light guide plate. The measurement results are shown in Table 1.

As shown in Table 1, in Examples 1 to 6, a high brightness was attained in which the brightness was greater than 500 cd/m$^2$, whereas in Comparative Examples 1 to 4, the brightness was not greater than 500 cd/m$^2$. In Comparative Examples 3 and 4, the total light ray transmittance of the base material film was higher than those of the base material films of the examples, but the absorbance of the light at the wavelength of 450 nm was 1.1%, and thus, the brightness was low. From the results described above, effectiveness of the present invention was confirmed.

TABLE 1

| | | | | First Barrier Film | | | | | |
|---|---|---|---|---|---|---|---|---|---|
| | Film Thickness of Wavelength Conversion Layer (μm) | Toluene Dispersion Liquid of Quantum Dot 1 (Part by Mass) | Toluene Dispersion Liquid of Quantum Dot 2 (Part by Mass) | First Base Material Film | | | Barrier Layer Provided in First Base Material Film Type | Total Light Ray Transmittance in First Barrier Film (%) | Absorbance of Light at Wavelength of 450 nm in First Barrier Film (%) |
| | | | | Type | Thickness (μm) | Total Light Ray Transmittance (%) | Absorbance of Light at Wavelength of 450 nm (%) | | | |
| Example 1 | 50 | 10 | 1 | PET1 | 50 | 90.1 | 0.7 | SiN | 89.6 | 3.7 |
| Example 2 | 50 | 10 | 1 | PET2 | 38 | 90.1 | 0.4 | SiN | 89.6 | 3.4 |
| Example 3 | 50 | 10 | 1 | COP1 | 32 | 91.4 | 0.1 | SiN | 90.9 | 3.1 |
| Example 4 | 50 | 10 | 1 | PS1 | 53 | 90.1 | 0.2 | SiN | 89.6 | 3.2 |
| Example 5 | 40 | 10 | 1 | PET2 | 38 | 90.1 | 0.4 | SiN | 89.6 | 3.4 |
| Example 6 | 40 | 10 | 1 | PET1 | 50 | 90.1 | 0.7 | SiOx | 89.1 | 5.7 |
| Comparative Example 1 | 50 | 10 | 1 | PEN1 | 40 | 87.7 | 1.6 | SiN | 87.2 | 4.6 |
| Comparative Example 2 | 50 | 10 | 1 | PC1 | 93 | 89.2 | 3.7 | SiN | 88.7 | 6.7 |
| Comparative Example 3 | 50 | 10 | 1 | TAC1 | 80 | 92.9 | 1.1 | SiN | 92.4 | 4.1 |
| Comparative Example 4 | 40 | 10 | 1 | TAC1 | 80 | 92.9 | 1.1 | SiN | 92.4 | 4.1 |

| | Second Barrier Film | | | | | | | |
|---|---|---|---|---|---|---|---|---|
| | Second Base Material Film | | | | Barrier Layer Provided in Second Base Material Film Type | Total Light Ray Transmittance in Second Barrier Film (%) | Absorbance of Light at Wavelength of 450 nm in Second Barrier Film (%) | Brightness (cd/m$^2$) |
| | Type | Thickness (μm) | Total Light Ray Transmittance (%) | Absorbance of Light at Wavelength of 450 nm (%) | | | | |
| Example 1 | PET1 | 50 | 90.1 | 0.7 | SiN | 89.6 | 3.7 | 506 |
| Example 2 | PET2 | 25 | 90.1 | 0.4 | SiN | 89.6 | 3.4 | 521 |
| Example 3 | COP1 | 50 | 91.4 | 0.1 | SiN | 90.9 | 3.1 | 532 |
| Example 4 | PS1 | 25 | 90.1 | 0.2 | SiN | 89.6 | 3.2 | 527 |
| Example 5 | PET2 | 25 | 90.1 | 0.4 | SiN | 89.6 | 3.4 | 507 |
| Example 6 | PET1 | 50 | 90.1 | 0.7 | SiOx | 89.1 | 5.7 | 501 |
| Comparative Example 1 | PEN1 | 80 | 87.7 | 1.6 | SiN | 87.2 | 4.6 | 472 |
| Comparative Example 2 | PC1 | 80 | 89.2 | 3.7 | SiN | 88.7 | 6.7 | 410 |
| Comparative Example 3 | TAC1 | 80 | 92.9 | 1.1 | SiN | 92.4 | 4.1 | 491 |
| Comparative Example 4 | TAC1 | 80 | 92.9 | 1.1 | SiN | 92.4 | 4.1 | 472 |

What is claimed is:

1. A wavelength conversion member, comprising:
   a wavelength conversion layer containing an organic matrix and at least one type of quantum dot which is excited by exciting light and emits fluorescent light, and which is dispersed in the organic matrix; and
   a base material film on at least one surface of the wavelength conversion layer,
   wherein in the base material film, an absorbance of light at a wavelength of 450 nm measured by using an integrating sphere is less than 0.9%, and a total light ray transmittance is less than 92%, wherein the base material film includes an oxygen barrier layer including at least one inorganic layer formed in contact with a surface of the base material film on the wavelength conversion layer side, wherein the inorganic layer contains a silicon nitride, and wherein in the base material film including the oxygen barrier layer, an absorbance of light at a wavelength of 450 nm measured by using an integrating sphere is less than 4.0%, and a total light ray transmittance is less than 92%.

2. The wavelength conversion member according to claim 1, wherein the oxygen barrier layer includes at least one organic layer between the base material film and the inorganic layer.

3. The wavelength conversion member according to claim 1, wherein the base material film includes an irregularity imparting layer imparting an irregular structure to a surface of the base material film on a side opposite to the wavelength conversion layer side.

4. The wavelength conversion member according to claim 1, wherein the base material film includes an optical diffusion layer on a surface of the base material film on a side opposite to the wavelength conversion layer side.

5. The wavelength conversion member according to claim 1, wherein the base material film is provided on both surfaces of the wavelength conversion layer.

6. The wavelength conversion member according to claim 1, wherein an average film thickness of the base material film is less than or equal to 40 µm.

7. The wavelength conversion member according to claim 1, wherein the base material film contains polyethylene terephthalate.

8. A backlight unit, comprising:

a planar light source allowing primary light to exit;

the wavelength conversion member according to claim 1 which is provided on the planar light source;

a retroreflective member disposed to face the planar light source with the wavelength conversion member sandwiched therebetween; and a reflection plate disposed to face the wavelength conversion member with the planar light source sandwiched therebetween, wherein the wavelength conversion member emits the fluorescent light by using at least a part of the primary light exiting from the planar light source as exciting light, and allows at least light including secondary light formed of the fluorescent light to exit.

9. A liquid crystal display device, comprising:

the backlight unit according to claim 8; and a liquid crystal unit disposed to face the backlight unit on the retroreflective member side.

* * * * *